United States Patent [19]

Inui

[11] 4,359,010
[45] Nov. 16, 1982

[54] MEANS FOR DECREASING WAVE RESISTANCE ON MARINE VESSELS

[75] Inventor: Takao Inui, Tokyo, Japan

[73] Assignees: Ishikawajima Harima Jukogyi, Tokyo; Kawasaki Jukogyo Kabushiki Kaisha, Hyogo, both of Japan

[21] Appl. No.: 144,870

[22] Filed: May 29, 1980

[30] Foreign Application Priority Data

Dec. 19, 1978 [JP] Japan ............................ 53-155723

[51] Int. Cl.³ .............................................. B63B 1/40
[52] U.S. Cl. ...................................................... 114/57
[58] Field of Search ............... 114/57, 67 R, 127, 129, 114/140, 149, 152, 162, 163, 164, 56; 440/66

[56] References Cited

U.S. PATENT DOCUMENTS

| 352,682 | 11/1886 | Edmondson | 114/129 |
| 528,967 | 11/1894 | Peabody | 114/163 |
| 1,809,184 | 6/1931 | Schultz | 114/162 |
| 1,980,114 | 11/1934 | Taylor | 114/140 |
| 2,991,749 | 7/1961 | Patterson | 114/132 |
| 3,138,130 | 6/1964 | Morgan | 114/57 |
| 3,180,299 | 4/1965 | Inui | 114/57 X |
| 3,438,074 | 4/1969 | Goyen | 114/56 |
| 3,991,697 | 11/1976 | Taniguchi | 114/57 |
| 4,217,844 | 8/1980 | Gruzling | 114/163 X |

FOREIGN PATENT DOCUMENTS

| 822353 | 11/1951 | Fed. Rep. of Germany | 114/163 |
| 135158 | 4/1920 | United Kingdom | 114/57 |

Primary Examiner—Trygve M. Blix
Assistant Examiner—Stephen P. Avila
Attorney, Agent, or Firm—Stevens, Davis, Miller & Mosher

[57] ABSTRACT

A marine vessel has a hull which is provided at the stern part thereof with a propeller. In order to decrease the wave resistance at the stern part of the hull, it is provided with a wave generating member which extends aft beyond the aftermost point of the full load water line. The member produces waves which are opposite in phase to and interfere with waves as produced at the stern part of the hull whereby the waves can at least partially be cancelled.

4 Claims, 4 Drawing Figures

MEANS FOR DECREASING WAVE RESISTANCE ON MARINE VESSELS

The present invention relates to marine vessels and more particularly to means for decreasing wave resistance on such marine vessels.

In the field of naval architecture, it has been known that wave making resistance occurs when marine vessels produce waves as they proceed and that such wave making resistance can be decreased by making use of interference effects among waves which are produced at different parts of a vessel. As regards the design of the fore part of such vessel, it has been proposed and already put into practice to combine a bulbous bow configuration with a vessel fore part of hull which is of opposite phase with respect to the bulbous bow. As regards the aft part of the vessel, however, there has been no effective way of decreasing stern waves. It has been recognized that the mechanisms of producing stern waves are highly dependent on the viscosity of water and also influenced by the propeller and rudder mechanisms so that the theory of the vessel fore part design cannot be applied. In recent years, it has been proposed to provide a vessel hull at the aft part in front of the propeller with a configuration of or similar to a body of revolution having a longitudinally extending axis of revolution. However, since such configuration is located in front of the propeller and deep below the water surface, any significant effect cannot be expected for decreasing the wave making resistance at the stern part of the vessel.

It is therefore an object of the present invention to provide means for decreasing wave making resistance at the stern part of a vessel.

Another object of the present invention is to provide at the stern part of a vessel with means for producing waves which may interfere with waves as produced at the stern of the vessel to thereby decrease the wave making resistance at the stern part.

A further object of the present invention is to provide means for decreasing wave making resistance at the stern part of a vessel, which can be applied not only to large scale vessels but also to medium or small sized vessels such as war vessels, yachts and motor-boats.

According to the present invention, the above and other objects can be accomplished by a marine vessel including a hull in which a full load water line is defined, said hull having a stern part whereby the full load water line has an aftermost point, at least one wave generating configuration provided at the stern part of the hull and extending aft beyond the aftermost point of the full load water line, said wave generating configuration being at least partially located below the full load water line to produce waves which are opposite in phase to and interfere with waves produced at the stern part of the hull to thereby decrease overall waves at stern part of the vessel. Preferably, the wave making configuration extends beyond the aftermost point of the full load water line by a distance not smaller than 1% of the hull length. In a preferable mode of the present invention, the wave generating configuration may be comprised of a member having a horizontal section of a streamlined configuration. The longitudinal dimension of such member may preferably be approximately 3% of the hull length. The width of the member may be determined in accordance with the shape and the speed of the vessel but may preferably approximate 1% of the hull length. Alternatively, however, the wave generating configuration may be in the form of a flat plate or of a body of revolution having a longitudinally extending axis of revolution.

The wave generating configuration or member may be connected with the stern part of the hull aft of the propeller and in the vicinity of the water line so as to extend aft therefrom. The member may be made of any suitable material such as a steel plate which has a sufficient structural strength. There is no specific limitation in the number of such wave generating members. When only one member is to be provided, it should be located along the longitudinal center line of the hull. When a plurality of members are to be provided, they should be located transversely symmetrically with respect to the longitudinal vertical center plane of the hull. The wave generating member is oriented with its longitudinal axis extending in alignment or parallel with the longitudinal center line of the hull. The member may be secured to the vessel hull by welding or any other suitable means, or retractably mounted thereon through a suitable mounting mechanism.

The above and other objects and features of the present invention will become apparent from the following descriptions of a preferred embodiment taking reference to the accompanying drawings, in which.

Figure 1:
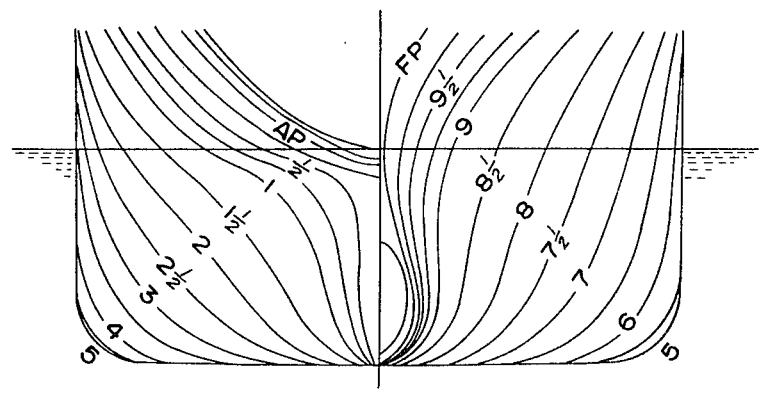
FIG. 1 is a hull lines body plan showing the configurations of the bow and stern part of a high speed container carrier marine vessel.
Figure 2:
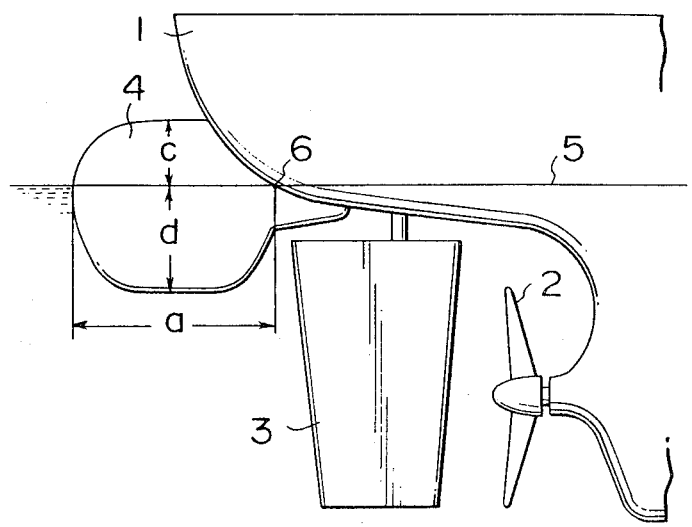
FIG. 2 is a fragmentary side view of the stern part of a marine vessel in accordance with one embodiment of the present invention.
Figure 3:
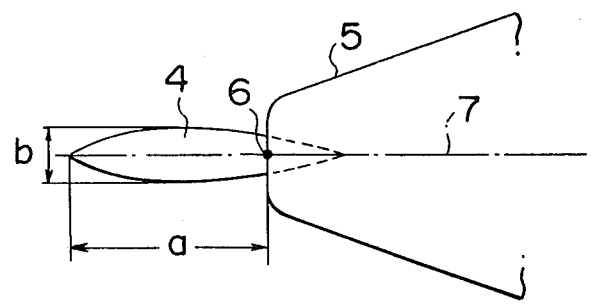
FIG. 3 is a plan view of the stern part shown in FIG. 2.

Referring now to the drawings, particularly to FIG. 1, there is shown an example of a marine vessel. FIG. 1 shows transverse profiles at various longitudinal points of a high speed container ship considered to have an ideal hull shape for decreasing resistance prior to this invention. The right side of FIG. 1 shows the profile of the front half of the ship while the left side shows the rear half. FIGS. 2 and 3 show an embodiment of the present invention in which a wave generating member 4 is attached to the stern of the vessel shown in FIG. 1. Referring further to FIG. 2, the marine vessel shown therein includes a hull 1 which carries a propeller 2 and a rudder 3 provided at the stern part thereof. On the hull 1, there is defined a full load water line 5 which intersects the stern profile of the hull 1 at the point 6. Further, a longitudinal center line 7 is defined in the hull 1.

As shown in FIGS. 2 and 3, the wave generating member 4 extends aft beyond the aftermost point 6 by a distance a and has a maximum widthwise demension or thickness b. Further, the member 4 extends upwardly from the water line 5 by a distance c and downwardly by a distance d. In a preferable aspect of the present invention, the longitudinal dimension a of the member 4 is approximately 3% of the total length of the hull 1, whereas the dimensions b, c and d are approximately a/4, a/3 and a/2, respectively. In the illustrated embodiment, the member 4 is welded to the aft end part of the hull 1.

It will be noted in FIG. 3 that the wave generating member 4 has a horizontal section of a streamlined configuration. With this arrangement, the member 4 produces waves which are opposite in phase to the waves as produced at the stern part of the hull 1 so that the both waves interfere with each other to thereby decrease the overall waves. It should therefore be understood that the resistance on the vessel can be decreased by providing the wave generating member 4.

Figure 4:
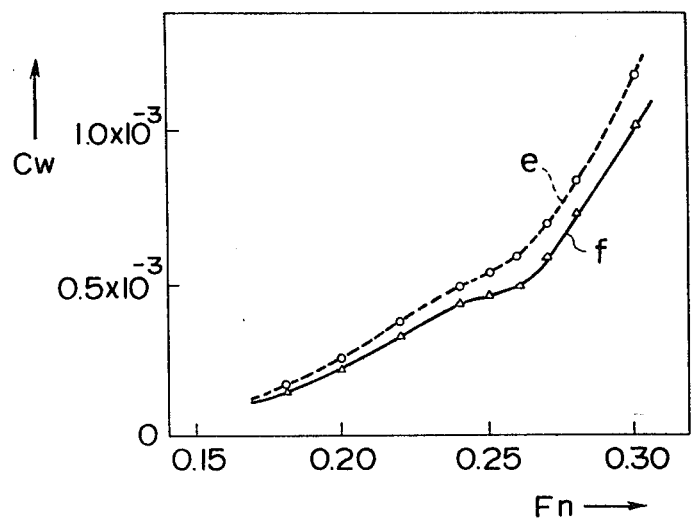
FIG. 4 is a diagram showing the decrease of the wave resistance in accordance with the present invention.

FIG. 4 shows wave resistance curves as obtained through towing tests which measure the resistance on vessels. In FIG. 4, the ordinate represents the coefficient Cw of the wave resistance and the abscissa the Froude number which represents the vessel speed in non dimensional form. The curve e represents the resistance on a conventional vessel which is not provided with the wave generating member 4 in accordance with the present invention, whereas the curve f represents the resistance on a vessel having a wave generating member 4. In FIG. 4, it will be noted that the wave resistance can be decreased by approximately 15% under an operating speed range in a vessel having the wave generating member 4.

The invention has thus been shown and described with reference to a specific embodiment, however, it should be noted that the invention is in no way limited to the details of the illustrated arrangements but changes and modifications may be made without departing from the scope of the appended claims.

I claim:

1. A marine vessel comprising: a hull in which a full load water line is defined, said hull having a rear portion wherein the full load water line has a rearwardmost point, a rudder for steering said vessel mounted to said hull, and at least one wave forming member separate from said rudder and immovably fixed to the rear portion of the hull and extending rearwardly beyond the rearwardmost point of the full load water line, the width of said wave forming member being substantially smaller than that of a portion of said hull to which said wave forming member is connected, so that a sharp transition occurs in the outer profile of the horizontal sectional configuration of said wave forming member and said hull taken along the full load water line, said transition forming a neck portion between said wave forming member and said hull, and said wave forming member having a first substantial portion exposed above the full load water line and located below a top edge of said hull, and a second substantial portion located below the full load water line and located above a lowermost portion of said hull, said wave forming member producing waves which are opposite in phase to and interfere with waves produced at the rear portion of the hull to thereby decrease overall waves at a stern portion of said vessel.

2. A marine vessel in accordance with claim 1 in which said wave forming member extends beyond the rearwardmost point of the full load water line by a distance "a" not smaller than 1% of the hull length, and the maximum width "b" of said wave forming member is less than or approximately equal to 1% of the hull length, said distance "a" being substantially larger than said maximum width "b".

3. A marine vessel in accordance with claim 2 in which said wave forming member has a longitudinal dimension of approximately 3% of the hull length and a widthwise dimension of approximately 1% of the hull length.

4. A marine vessel in accordance with claim 1 in which said wave forming member has a streamlined configuration in a horizontal section taken substantially along the full load water line so that said wave forming member gradually and smoothly diverges from its connection portion with said hull towards its intermediate portion, and gradually and smoothly converges from the intermediate portion towards its rear end.

* * * * *